United States Patent
Ivarsoy et al.

(10) Patent No.: US 8,205,152 B2
(45) Date of Patent: Jun. 19, 2012

(54) SYSTEM AND METHOD FOR FORMATTING AND DISPLAYING FRAMESET DOCUMENTS

(75) Inventors: Geir Ivarsoy, Oslo (NO); Snorre M. Grimsby, Skjetten (NO)

(73) Assignee: Opera Software ASA, Oslo (NO)

( * ) Notice: Subject to any disclaimer, the term of this patent is extended or adjusted under 35 U.S.C. 154(b) by 1617 days.

(21) Appl. No.: 11/267,316

(22) Filed: Nov. 7, 2005

(65) Prior Publication Data

US 2006/0259859 A1 Nov. 16, 2006

Related U.S. Application Data

(60) Provisional application No. 60/625,586, filed on Nov. 8, 2004.

(51) Int. Cl.
*G06F 17/00* (2006.01)
(52) U.S. Cl. ........ 715/246; 715/234; 715/240; 715/243; 715/244; 715/245
(58) Field of Classification Search .................. 715/238, 715/240, 243–247, 272–273, 277, 234
See application file for complete search history.

(56) References Cited

U.S. PATENT DOCUMENTS

| | | | | |
|---|---|---|---|---|
| 6,993,716 B2* | 1/2006 | Palmieri | | 715/265 |
| 7,272,790 B2* | 9/2007 | Fabritius | | 715/209 |
| 7,362,311 B2* | 4/2008 | Filner et al. | | 345/169 |
| 7,385,615 B2* | 6/2008 | Vale et al. | | 345/660 |
| 2002/0013165 A1* | 1/2002 | Ostergaard | | 455/566 |
| 2004/0105127 A1* | 6/2004 | Cudd et al. | | 358/1.18 |
| 2004/0107403 A1* | 6/2004 | Tetzchner | | 715/513 |
| 2005/0021851 A1* | 1/2005 | Hamynen | | 709/245 |
| 2006/0062362 A1* | 3/2006 | Davis | | 379/100.13 |

OTHER PUBLICATIONS

Opera Small-Screen Rendering, publication printed on Jan. 8, 2004, Opera Software, pp. 1-4.*

* cited by examiner

*Primary Examiner* — Chau Nguyen
(74) *Attorney, Agent, or Firm* — Birch, Stewart, Kolasch & Birch, LLP (57) ABSTRACT

The present invention relates to a method, terminal, and computer program for presenting a markup language document which contains a frameset. The method comprises the steps of interpreting the instructions in the document so that no scrollbars are displayed in the individual frames. The frames may be displayed in a reformatted manner, e.g., with expanded dimensions and/or reformatted contents. Such reformatting of the displayed frames does not require any revision of the markup language document.

20 Claims, 6 Drawing Sheets

SYSTEM AND METHOD FOR FORMATTING AND DISPLAYING FRAMESET DOCUMENTS

This Nonprovisional application claims priority under 35 U.S.C. §119(e) on U.S. Provisional Application No. 60/625,586 filed on Nov. 8, 2004, the entire contents of which are hereby incorporated by reference.

BACKGROUND OF THE INVENTION

1. Field of the Invention

The present invention relates to displaying information on an electronic terminal, and more particularly, to displaying a Web page, which includes a frameset in a suitable format based on a display resolution of the electronic terminal.

2. Description of Related Art

Client computers may connect to a network in order access various types of content from servers connected to that network. The World Wide Web (referred to simply as "the Web") is a network of computers all over the world that communicate with each other using protocols and computer languages developed by the World Wide Web Consortium (W3C). Data available on the Web is generally stored in documents called Web pages.

A client computer connected to the World Wide Web may retrieve information by downloading Web pages stored on various servers on the Web. A Web browser is a computer program that, when executed on a client computer, enables the client computer to read and display Web pages. A Web browser includes a user interface component for addressing a particular server on network and designating a particular document (e.g., a Web page) to be obtained from the addressed server. Using the Hypertext Transfer Protocol (HTTP), a Web browser fetches the designated documents from the server. Also, a Web browser includes a component for displaying the content of Web pages.

In particular, Web browsers are operable to display the content of Web pages, which are formatted as markup language documents. "Markup language document" generally refers to a text file that includes "markup tags." In particular, markup tags tell the Web browser how to display the Web page. Such tags are used to define hypertext links, specify format changes, or otherwise indicate how particular elements in the Web page should be displayed. Examples of markup language documents are Hypertext Markup Language (HTML), extensible Hypertext Markup Language (XHTML), and extensible Markup Language (XML) documents. For purposes of this disclosure, the term "(X)HTML" will hereafter be used to collectively refer to both HTML and XHTML documents.

Certain types of Web pages are known as frameset documents. Frameset documents may be formatted as either an HTML or XHTML document. The frameset technique is a part of (X)HTML, as defined by the W3C. The technique is used to combine a set of Web pages into a single browser window, while specifying the position of the different windows in one frameset document.

Specifically, a frameset document is an (X)HTML document in which a FRAMESET replaces the BODY section found in ordinary (X)HTML documents. The FRAMESET section specifies the layout of "frames," which are rectangular sub-areas in the main browser window. A separate document (e.g., markup language document) may be displayed inside each frame. When the sub-area for a particular frame is not large enough to display the entire Web document for that frame, scrollbars (vertical and horizontal) are appended to the frame to provide individual scrolling for that frame.

Framesets can be nested to any level. In a frameset document, the FRAMESET section may also contain a NOFRAMES element to provide alternative content for Web browsers that either lack frame support or are configured to ignore frames.

Most of the Web pages currently available on the World Wide Web are designed for desktop computers with large color monitors having relatively high resolutions. However, mobile wireless communication devices, such as mobile telephones and palmtop computers, typically have much smaller displays and, thus, much lower resolutions. Such low-resolution devices experience difficulties in displaying Web pages designed for higher resolutions. Ordinary television screens, which may also be used for displaying Web content, also typically have a lower resolution than common computer monitors. Thus, televisions screen similarly experience problems display many Web pages supporting high resolutions.

When characterizing a display, the term "resolution" refers to the number of horizontal and vertical pixels supported by the display. For example, an 800×600 resolution refers to 800 horizontal pixels and 600 vertical pixels. Typically, a screen that displays less than 800 pixels horizontally, or less than 600 pixels vertically, is understood as having a relatively low resolution and, thus, may need some assistance to display available Web pages. There are display devices with even smaller displays for viewing Web content, such as screens with resolutions of 640×480 or less, which are particularly in need of assistance for displaying Web documents.

A particular type of problem occurs when a low-resolution screen is used for displaying a frameset document. Specifically, a very small portion of the Web page inside each frame will fit into the sub-area of the screen defined for that frame, thereby requiring a large amount of scrolling to convey any meaningful information. Such scrolling may be required on two separate levels a user may be required to manipulate scrollbars in both the frame, and the frameset document.

In order to display Web content on low-resolution displays, some Web browsers utilize formatting techniques that remove or change the sizes of page elements in more or less intelligent manners. Existing formatting techniques have had relative success in displaying certain types of Web sties, but do not offer satisfying solutions for viewing frameset documents. Specifically, Web browsers with formatting techniques for low-resolution screens have until now been unable to display several frames simultaneously in one browser window.

Existing formatting technologies have attempted to deal with the problem of frameset documents. The most commonly used solution is to display a list containing different links to each of the frames. Examples of this approach are applied in Access Inc.'s Netfront™ browser and Anygraaf's Doris™ browser.

Another prior implementation has been to employ the NOFRAMES element, which displays content custom-made for browsers without support for frames. However, most modern desktop browsers support HTML frames and, thus, NOFRAMES content is rarely found on the Web.

Another approach to displaying frameset documents on a narrow screen is disclosed in U.S. Pat. No. 6,593,944, which is assigned to Palm, Inc. An implementation of this technique is found in the Handspring Blazer™ browser. This patent describes a method for generating a frame representation, which includes a plurality of geometric frame identifiers. Through this geometric representation, users can navigate into frameset pages one at the time. Another embodiment disclosed in this patent is to automatically display one of the frame pages, without navigating through the top-level frameset page. Both these techniques have limitations, since users will never see the whole content of the Web site within the same browser window. This makes navigation slow, and does not provide users with a complete overview of the page content.

Another approach to displaying frameset documents is disclosed in U.S. Patent Application Publication No. 2002/0054126 A1, "Browser translation between frames and no frames", filed by IBM Corp. The technique disclosed in this application rewrites the frameset document to create a page without frames. Specifically, multiple frames are transformed into a single document by exchanging frameset tags with proprietary "include" tags.

As such, none of the above-mentioned formatting techniques is able to retain multiple frames in the markup, and to simultaneously display the frames on one browser window of a low-resolution device.

SUMMARY OF THE INVENTION

Exemplary embodiments of the present invention are directed to a system and method for displaying a markup language document that includes a frameset, while eliminating the need for individual scrolling for any individual frame.

Exemplary embodiments of the present invention may be implemented on an electronic terminal having a relatively low-resolution display, which is used as a client terminal for a network (e.g., the Web). A computer program may be provided in and executed by the terminal in order to display frameset documents, according to exemplary embodiments of the present invention.

According to an exemplary embodiment, a frameset document is received and interpreted by an electronic terminal (e.g., using a Web browser) in such a manner that scrolling is disabled with respect to each individual frame in the frameset. In such an embodiment, the scrolling may be eliminated from the displayed frames without altering the markup in the frameset document. Thus, the elimination of scrolling may make the frames appear invisible to the user of the terminal, even though the frames are maintained in the markup language document.

According to a further exemplary embodiment, the frameset document is interpreted in such a manner that no more than one scrollbar is required to view the entire contents of the frameset. In other words, the contents in each of the respective frames (e.g., Web page) may be viewed by using only one scrollbar, which is appended to the top-level frameset document. For example, each of the frames may be displayed such that only one vertical scrollbar is displayed on the browser window to scroll throughout the entire frameset.

According to another exemplary embodiment, the frameset document may be interpreted by a terminal in such a manner as to maintain the dimensional ratios between the frames in the frameset, as defined by the markup in the frameset document. Accordingly, the height and width ratios of the frame layout, which is defined in the FRAMESET section of the frameset document, may be maintained when the document is displayed.

According to an exemplary embodiment, the use of scrolling for each individual frame may be eliminated by reformatting the frame's dimensions (height and/or width), contents, and/or position within the displayed frameset.

For instance, in an exemplary embodiment, a frame's markup document may be reformatted in such a manner that the area required for the document's contents is reduced.

In another exemplary embodiment, a frame's dimensions (height and/or width) could be expanded to the extent necessary for fitting the contents in the frame's dimensions.

In a further exemplary embodiment, a frame might be repositioned to a part of the frameset, which its (or another frame's) dimensions to be adequately expanded to display its contents.

According to an exemplary embodiment, frame reformatting may be performed recursively when the frameset includes a nested frameset. For instance, if one of the frames contains a nested frameset, each of the child frames may be reformatted as necessary. Thereafter, the parent frame may be reformatted (e.g., expanded) to the extent necessary to display its contents without the use of scrolling in the parent frame.

According to an exemplary embodiment, expanded dimensions may be determined for each of the frames, which eliminate the need for any scrollbars in the frames. Thereafter, a formatting technology (e.g., Small-Screen Rendering or Medium-Screen-Rendering developed by Opera Software) may be applied to each frame page, for example, to resize and/or reposition the frame's contents. All of the frames may be displayed according to the expanded dimensions and reformatted contents, such that scrollbars are displayed only in relation to the top-level frameset.

According to an exemplary embodiment of the present invention, framesets may either be wrapped or stacked, whichever is optimal based on the characteristics of the screen and/or the Web page being viewed.

According to exemplary embodiments, the present invention may be used to display a frameset document in one Web browser window without using individualized frame scrolling or altering the markup in the document. Such embodiments are applicable to any electronic terminal used for displaying Web content, even if the terminal contains a low-resolution display. These embodiments enable users to browse Web sites that contain very large frames, without even knowing about the frames' existence.

Accordingly, the frameset page may be displayed as if there were no frames. One advantage of the present invention is that users do not have to scroll individual frames to access content. Instead, users scroll the entire document as they would any page without frames. Focus and navigation issues within the frames are eliminated, which is particularly important when using devices whose navigational tools and display resolution are limited.

BRIEF DESCRIPTION OF THE DRAWINGS

Exemplary embodiments of the present invention will become more fully understood from the detailed description given hereinbelow and the accompanying drawings. These drawings are given by way of illustration only and, thus, are not limiting on the present invention. In the drawings, like reference numbers represent like elements, wherein.

DETAILED DESCRIPTION OF THE INVENTION

The present invention is directed to a system and method for displaying a Web page, or other markup document, which contains a frameset. Exemplary embodiments of the invention are directed to eliminating, or at least substantially reducing, the use of scrolling in individual frames in order to view the content of the displayed frameset.

According to an exemplary embodiment, the frameset document is a markup language document written in either HTML or XHTML format. As described earlier, the term "(X)HTML" will be used hereafter to collectively refer to both HTML and XHTML documents.

The present invention may be implemented using an electronic terminal, which is connected to a network as a client. For instance, the terminal may be connected to the Internet to browse Web servers and download (X)HTML Web pages from the servers. A Web browser is generally executed on such electronic terminals to perform these functions. The Web browser also generally includes a computer program component for displaying the downloaded Web page.

According to an exemplary embodiment, the present invention may be implemented in a client terminal as part of the Web browser program responsible for interpreting the (X)HTML instructions or tags of the Web page, in order to display the content on the terminal's screen.

Figure 1:
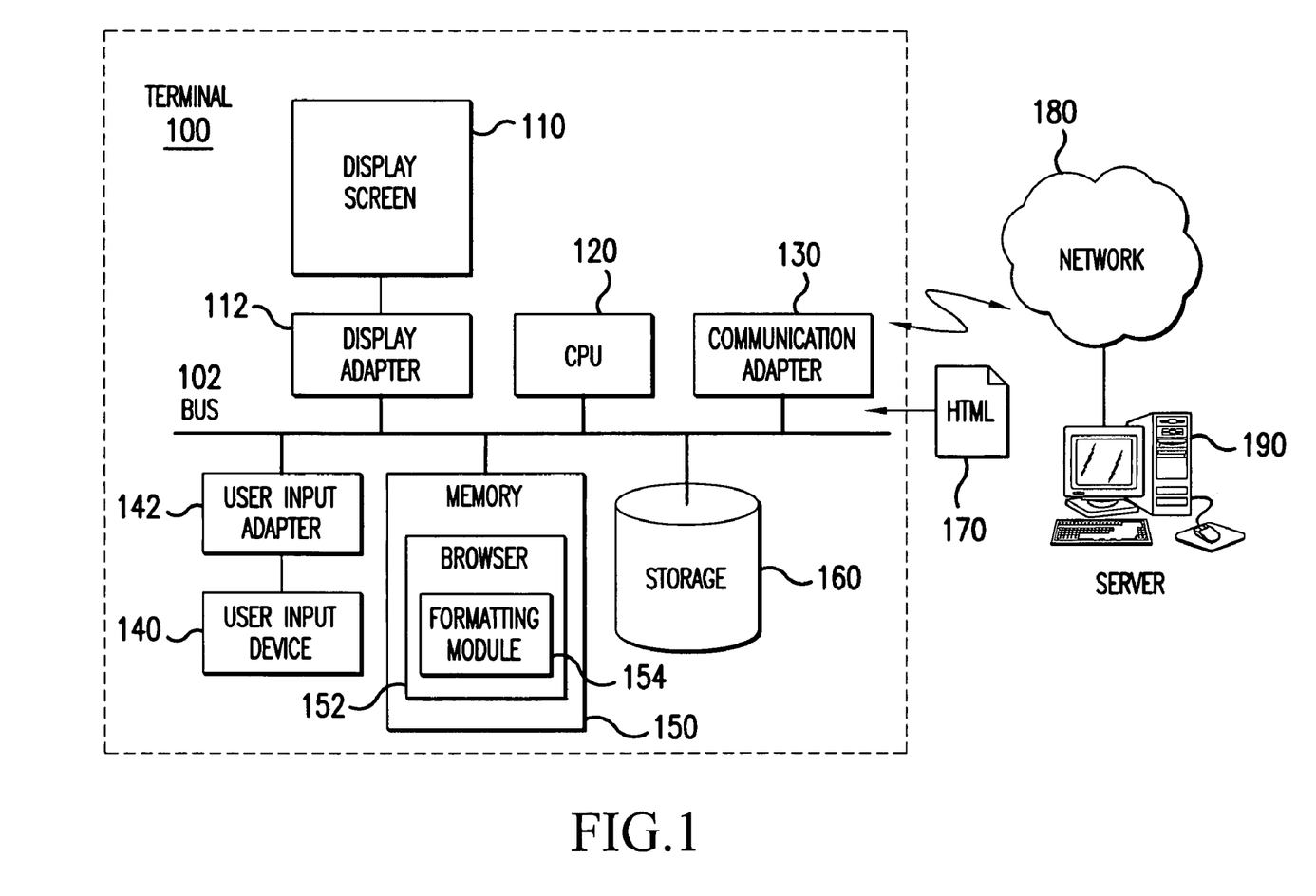
FIG. 1 is a block diagram of a system including a client terminal, according to an exemplary embodiment of the present invention.

FIG. 1 is a block diagram of a system that includes a terminal according to the invention.

Terminal 100 may be any type of electronic computing device capable of interpreting and displaying markup language documents with a frameset, such as (X)HTML pages. While FIG. 1 illustrates terminal 100 as being a client terminal connected to a server 190 via a network 180, it should be noted that the present invention may also be implemented in terminals 100 that are not configured as clients. For instance, an (X)HTML frameset document need not be transferred to the terminal 100 via the network 180—another medium (e.g., floppy disc, CD-ROM) may be used. As such, exemplary embodiments of the present invention may be used on terminals 100 without network capability.

Many Web pages are authored under the assumption that they will be displayed according to a 1000×600 pixel resolution. Other Web pages are authored assuming a display resolution of 800×600 pixels. Such resolutions are generally supported by the displays for conventional desktop computers in use today. As such, the Web pages are generally designed to have a longer horizontal than vertical dimension.

In an exemplary embodiment, the terminal 100 may be a type of device having a relatively low-resolution display screen, in comparison with conventional desktop computers. Such relatively low resolutions may be classified, for purposes of this disclosure, as either "low-resolution" or "medium-resolution" devices. Examples of terminals 100, which have either a low- or medium-resolution display, include mobile telephones and palmtop computers.

For purposes of this disclosure, a "low-resolution" display may refer to a display whose resolution supports less than 350 pixels horizontally. Other displays, whose resolution allows between 350-800 horizontal pixels, may be classified as 'medium-resolution' displays.

Referring to FIG. 1, the terminal 100 includes a display 110. According to an exemplary embodiment, this display 110 is configured with a low or medium resolution.

For many types of low- and medium-resolution terminals 100, the display 110 may be "narrow." That is, the display 110 may support more vertical pixels than horizontal. Since most (X)HTML documents are designed under the assumption that the display's 110 width exceeds the height, the narrow configuration of a medium- or low-resolution display 110 may increase the difficulty in viewing (X)HTML content. The difficulty is magnified for (X)HTML documents that include one or more framesets.

However, there are other types of low- and medium-resolution displays 110 that are not narrow. For instance, the terminal 100 may utilize a television screen as its display 110. Even though television screens are longer in the horizontal direction than vertical, they generally support a medium-resolution, or less.

It should be noted, however, that the present invention is not limited to low- and medium-resolution displays 110. In an alternative exemplary embodiment, the display 110 may have a relatively high resolution. For instance, the display 110 may be a conventional computer screen (e.g., 1000×600 pixels or better). For such displays 110, the present invention may be used, for example, to lessen the amount of scrolling necessary to view certain types of frameset documents. For example, this may be helpful for terminals 100 that only provide a keyboard input device for navigating the Web page, instead of also including a mouse or touch pad device, so that it becomes less burdensome to select and scroll different frames in a displayed frameset document.

Referring again to FIG. 1, the terminal 100 may also comprise an internal bus 102. In the terminal 100, a display adapter 112 may interconnect the bus 102 and the display 110. The terminal 100 further comprises a user input device 140, such as a keyboard and/or pointing device (touch pad, mouse, etc.). A user input adapter 142 interconnects the bus 102 and the input device 140.

As shown in FIG. 1, the internal bus 102 is connected to a central processing unit (CPU) 120. The CPU 120 is configured to execute computer program instructions held in a memory 150, which is also connected to the bus 102. The bus 102 may also be connected to a data storage device 160, which provides non-volatile storage of programs and/or data. A storage adapter (not shown) may be used for connecting the data storage device 160 to the bus 102.

According to an exemplary embodiment, the memory 150 is adapted to hold a Web browser program 152. A Web browser 152 generally includes computer program components that allow the terminal 100 to request and access content on a communications network 180. When the terminal 100 is configured as a client on the Web, the Web browser 152 allows the user to designate an (X)HTML document 170 on the Web server 110. Thereafter, the Web browser 152 fetches the designated (X)HTML document 170 for the client terminal 100. The Web browser 152 will also generally include a computer program component for displaying the content of the retrieved (X)HTML document 170 on the display 110 of terminal 100. Such features are very common, and are found in Web browser programs such as the Opera™ browser, Netscape Navigator™, the Mozilla™ browser, and Internet Explorer™. It will be readily apparent to those of ordinary skill in the art how to implement these common components in the Web browser 152.

However, according to an exemplary embodiment of the present invention, the browser 152 also includes a formatting module 154, for implementing a novel method of displaying an (X)HTML document 170, which includes a frameset.

As discussed above, the (X)HTML document 170 may be retrieved from a server 190 via network 180. The document 170 may be received at a communication adapter 130, which is connected to the bus 102 in terminal 100. According to an exemplary embodiment, the network 180 may be enabled to provide wireless mobile communication between a client terminal 100 and the content server 190, which provides the (X)HTML content. As such, the network 180 illustrated in FIG. 1 may typically incorporate both the Internet, and a mobile communication network.

Examples of mobile communications networks that may be used include GSM (Global System for Mobile Communications), GPRS (General Packet Radio Service), UMTS (Universal Mobile Telecommunications Service), CDMA (Code-Division Multiple Access), and PCS (Personal Communications Service) networks, or any combination thereof. The communication adapter 130 may thus be a GSM, GPRS, UMTS, CDMA, or PCS module, adapted for interoperability with the mobile communication network included in the network 180.

Figure 2:
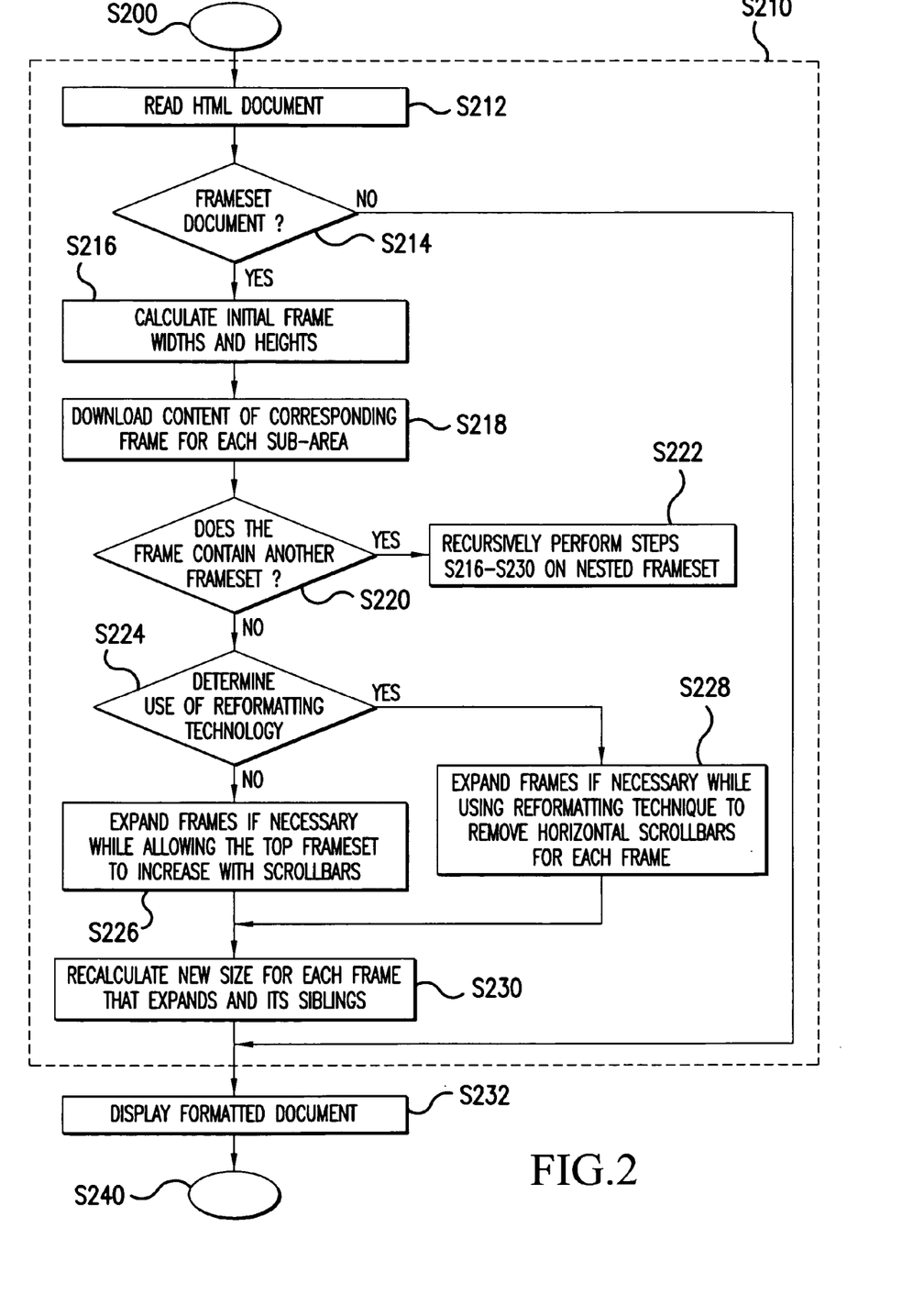
FIG. 2 is a flowchart illustrating a method for displaying a frameset document on a terminal, according to an exemplary embodiment of the present invention.

FIG. 2 is a flowchart illustrating a method for displaying a frameset document on terminal 100, according to an exemplary embodiment. According to an exemplary embodiment, the steps may be performed by the Web browser 152, which is executed in the terminal 100. However, it will be envisioned that some or all of the steps illustrated in FIG. 2 may be embodied in another computer program. Furthermore, these steps may be implemented using any combination of software and hardware, as will be contemplated by those of ordinary skill in the art.

According to an exemplary embodiment, the method illustrated in FIG. 2 is used for displaying a Web document 170, which is formatted according to (X)HTML. In such an embodiment, the document 170 may include one or more framesets. However, the present invention is not thus limited. For instance, this method may be implemented in a component of the Web browser 152, which is used for displaying downloaded pages 170 that do not contain a frameset, or are not formatted according to (X)HTML.

In an exemplary embodiment, the method of FIG. 2 includes a formatting process S210, which may be performed by the formatting module 154 contained in the Web browser 152 (illustrated in FIG. 1). However, the present invention is not thus limited. As indicated above, the present invention covers embodiments where different steps shown in the formatting process S210 of FIG. 2 are not performed in the same computer program component. (In fact, one or more of the steps may not even be executed by the Web browser 152.)

According to an exemplary embodiment, the formatting process S210 is operable receive a frameset document 170, and interpret the (X)HTML instructions (e.g., tags and attributes) in the document 170 in such a manner as to display the content of all of the frames, while making the existence of frames invisible to the user. As such, scrollbars are eliminated from the frames, and each frame is reformatted (if necessary) to ensure that the contents of all of the frames are viewable using only the scrollbars displayed in the top-level frameset.

Step S200 illustrates the start of the method in FIG. 2. The formatting process S210 includes steps S212-S230. Subsequent to the formatting process S210, step S232 is performed in order to display the (X)HTML document, as interpreted by the formatting process, on the display 110 of the terminal 100.

As shown in FIG. 2, the formatting process S210 is initiated by the reading step S212. According to an exemplary embodiment, this step S212 may be performed in the terminal 100 as the (X)HTML document 170 is received by the communication adapter 130, and transferred to the CPU 120 for processing in accordance with the instructions in the formatting module 154 of the browser 152.

Next, in decision step S214, it is determined whether the (X)HTML document 170 includes a frameset or not. Specifically, step S214 determines whether the (X)HTML document 170 includes a FRAMESET section. If step S214 determines that the document 170 is not a frameset document, the process proceeds to the display step S232. However, if the (X)HTML document 170 is determined to be a frameset document, the process continues on to step 216.

In step 216, the instructions in the FRAMESET section of the document 170 are analyzed to calculate a set of frame dimensions for each of the frames. In an exemplary embodiment, step S216 calculates a height and width for each of the frames in the frameset. These frame dimensions may be calculated by extracting the frame dimensions as defined in the (X)HTML instructions, and scaling the extracted dimensions down based on the actual display resolution of the terminal display 110.

Specifically, the FRAMESET section of a (X)HTML document 170 includes one or more FRAMESET tags that define the layout of the frames to be displayed in the browser window.

The FRAMESET tag may define the height and width of each frame's sub-area according to different parameters, which include: pixels (px), percentage (%), and star (*). Only the pixels parameter is defined in absolute terms (i.e., an absolute value of pixels is specified). The % and * parameters are relative.

For instance, consider the following FRAMESET tags:
<frameset cols="25%, 75%">; and
<frameset cols=250, *>.

The first tag defines two frames in terms of the relative percentage (%) of the total number of pixels of the main browser window. In the first tag, the width of the first frame is ¼ of browser window's horizontal pixels, while the width of the second frame is ¾. Thus, if the browser window has 1000 horizontal pixels, the first frame will have a width of 250 pixels, while the second will have a width of 750 pixels.

The second tag defines the width of the first frame in terms of pixels, and the width of the second in terms of the star (*) parameter. Specifically, the * parameter indicates that the width of the second frame will be equal to the remaining pixels of the browser window, which are available after the 250 pixels of the first frame.

Although the % and * parameters are described in terms of horizontal pixels, those of ordinary skill in the art will realize that the parameters can be similarly used to define the height of each frame.

However, step S216 calculates the height and width dimensions of each frame in absolute terms, that is, in terms of pixels. Thus, if the frames are not defined by the (X)HTML document 170 in terms of pixels, they may be converted to absolute terms using the default display sizes for the (X)HTML document 170. Specifically, the (X)HTML document 170 is designed according to an assumed resolution (horizontal pixels×vertical pixels) at which it will be displayed. Thus, the default display width is the number of horizontal pixels assumed by the markup document 170, and the default display height is the number of vertical pixels assumed by the document 170.

After the frame dimensions defined by the (X)HTML document 170 are determined for each frame, step S216 scales down these dimensions, so that each frame fits within the terminal display 110. Specifically, this scaling operation may be performed according to the following equations:

$$S_{(width)} = \delta_{(width)} \times (\alpha_{(width)}/\beta_{(width)}) \quad \text{Eq. 1}$$

$$S_{(height)} = \delta_{(height)} \times (\alpha_{(height)}/\beta_{(height)}) \quad \text{Eq. 2}$$

where:

$S_{height}$ and $S_{width}$ are the calculated height and width for each frame (in terms of pixels);

$\delta_{height}$ and $\delta_{width}$ are the height and width for the frame, respectively, as defined by the frameset document 170 (in terms of pixels);

$\alpha_{height}$ and $\alpha_{width}$ are the available screen height and width for the frameset on the display screen, which are defined in absolute terms, and $\beta_{height}$ and $\beta_{width}$ are a default display height and width, which are defined in absolute terms, according to the instructions.

It should be noted that the terms $\alpha_H$ and $\alpha_W$ may represent the full display resolution of the terminal display 110, if the whole screen is to be used for displaying the Web browser window. However, if only a portion of the display 110 is to be used for displaying the browser window (and, thus, the frameset), these parameters may be scaled down accordingly.

Since step S216 scales down all of the frames by the same amount ($\alpha_{height,width}/\beta_{height,width}$) it is readily apparent that the ratios between the height and width dimensions of each frame are maintained.

In step S218 of FIG. 2, the contents of each of the individual frames are obtained and analyzed. For instance, the individual Web pages of the respective frames are downloaded from the server 190, and interpreted by the CPU 120 according to the formatting module 154 instructions.

Step S220 determines whether the top-level frameset includes a nested frameset. In other words, step S220, it is determined whether any of the frames contains a nested frameset. Any frame containing a frameset is referred to as a parent frame, and the frames contained in that frameset are the child frames.

If step S220 determines that any frame contains a nested frameset, the formatting process S210 continues at step S222.

In step S222, steps S216-S230 are recursively applied to the child frames in the nested frameset. This includes calculating height and weight dimensions for each of the child frames. It should be noted that, when these steps are recursively performed, the height and width dimensions for each child frame must be calculated based on the previously calculated frame dimensions of the parent frame. Specifically, the child frame dimensions must be scaled down so that the nested frameset will fit within the frame dimensions calculated for the parent frame.

If step S220 determines that none of the frames (in the frameset being processed) contains a nested frameset, then the process S210 continues to step S224.

As shown in FIG. 2, step S224 determines whether additional reformatting technology is available in the Web browser 152. In an exemplary embodiment, step S224 may be performed by checking the current options/settings in the browser 152. For example, this step may determine whether the browser 152 contains a program component for implementing the Small-Screen Rendering (SSR) technique or the Medium-Screen Rendering (MSR) technique developed by Opera Software.

Of course, step S224 may check whether the browser 152 is programmed to perform other suitable techniques for reformatting the contents of each frame. It should be noted that the additional reformatting technology need not be directly programmed into the Web browser 152. For example, it may be embodied as a separate program, which is to be executed in conjunction with the formatting module 154 of the browser 152.

Further description of additional reformatting techniques will be provided below in connection with step S228.

If step S224 determines that no additional reformatting technology is currently set, the process S210 continues at step S226 (hereafter referred to as "first frame-reformatting step"). Otherwise, the process continues at step S228 (hereafter referred to as "second frame-reformatting step").

In the first frame-reformatting step S226, a determination is made as to whether reformatting is necessary for each frame. Specifically, this determination is based on whether the contents of each frame will fit into the frame dimensions (height and width), as initially calculated in step S218.

If it is determined that the contents of a particular frame will not fit within the calculated frame dimensions, then at least one of the calculated frame dimensions may be expanded according to the first frame-reformatting step S226. However, whenever the calculated dimensions of a frame are expanded, scrolling will not be applied to the frame. Instead, any required scrolling will be implemented in connection with the top-level frameset. Thus, a user will only be required to scroll through the entire frameset to view the entire contents of the frameset.

According to an exemplary embodiment, the calculated height may be increased for each frame requiring reformatting. In such an embodiment, the frame's calculated height may be increased by a particular amount that allows the contents of that frame to fit within the frame's adjusted dimensions. Since the contents now fit in the frame's dimensions, no individual scrolling is necessary in relation to the increased frame dimension (although scrolling may be necessary in relation to the top-level frameset).

It may further be necessary to increase the calculated heights of other frames, even if the contents of those frames already fit within the calculated dimensions. Particularly, the height of other frames may be increased to help optimize the frameset's layout. Alternatively, the height of frames may be decreased in order to compensate for the increased height of a reformatted frame. For example, if a frame has unused space, the frame's calculated height may be decreased in order to compensate for an increase of another frame. (As described in step S230 below, each frame may determine whether it should be resized in response to a sibling frame being reformatted.)

In an embodiment where the first frame-reformatting step S226 only expands frames by increasing their calculated heights, the top-level frameset will be expanded only in the vertical direction. Thus, if the first frame-reformatting step causes the frameset's height to expand beyond the available display height $\alpha_{height}$ for the top-level frameset, only a vertical scrollbar will need to be appended to the top-level frameset as the frameset is displayed on the terminal display 110.

However, in an alternative exemplary embodiment, the first frame-reformatting step S226 may increase both the calculated heights and widths of frames, which require reformatting.

In a further embodiment, the first frame-reformatting step S226 may increase both the calculated height and width of all of the frames in such a manner as to maintain both the height ratios and width ratios between the frames in the frameset. As such, the first frame-formatting step may be implemented to determine a proportionate amount by which the calculated height and width of each frame must be expanded, in order to ensure that the contents of each frame fit within its expanded dimensions. Since the contents of the reformatted frame now fit within the frame's adjusted dimensions, no scrolling is necessary in connection with the frame's dimensions (although scrolling may be made necessary in relation to the top-level frameset).

In this embodiment, both vertical and horizontal scrollbars may be appended to the top-level frameset in order to allow the contents of each frame to be viewable.

Referring to FIG. 2, if step S224 determines that additional reformatting technology is available, then the process S210 continues to step S228, rather than step S226. In the second frame-reformatting step S228, this additional reformatting technology may be used to reformat the contents of a frame that requires reformatting. For example, the additional reformatting technology may be used to identify, resize, and reposition elements within each frame's page in order to limit the space taken up by the content within the frame. Furthermore, the additional reformatting technology may be used for repositioning entire frames.

As mentioned above, two examples of additional reformatting technologies that may be implemented in the Web browser 152 include the Small-Screen Rendering and Medium-Screen Rendering techniques developed by Opera Software.

The Small-Screen Rendering (SSR) technology is described in U.S. Patent Application Publication No. US 2004/107403 A1, entitled PRESENTING HTML CONTENT ON A SMALL SCREEN TERMINAL DISPLAY, the contents of which are herein incorporated by reference in its entirety. The Medium-Screen Rendering (MSR) technology is described in Patent Cooperation Treaty (PCT) Application No. PCT/NO03/00300, entitled PRESENTING HTML CONTENT ON A SCREEN TERMINAL DISPLAY, filed on Oct. 13, 2004, International Publication Number WO 2004/023450, the contents of which are herein incorporated by reference in its entirety. Both of these technologies can be used for retaining the frames, while reformatting the contents of a frameset document.

The SSR technology is typically used on very narrow screens such as mobile phones. In this technology, the frameset may be altered, such that the frames are displayed in a vertically stacked arrangement. In such an arrangement, the calculated width of each frame may be increased up to the available display width $\alpha_{width}$. Thereafter, the frames may be repositioned such that no two frames are displayed next to each other, horizontally.

Furthermore, SSR techniques may be used for reformatting the size of the contents to be displayed. For instance, elements in the frame's page may be repositioned to reduce the page's size. Also, the font size of text in the page may be reduced. Furthermore, the SSR technology may omit certain elements from being displayed, for example if they are unnecessary or incapable, or if their size cannot be adequately reduced.

According to the SSR technique, when the aggregate of the heights of the vertically stacked frames exceed the available display height $\alpha_{width}$ for the frameset in the display 110, a vertical scrollbar may be appended to the top-level frameset when the frameset is displayed. Thus, a user will be allowed to vertically scroll throughout the entire height of the frameset. Since the top-level frameset will not have been expanded horizontally, the vertical scrolling will make the entire contents of the displayed frameset viewable.

The MSR technology is often used for slightly larger screens, such as those on Personal Digital Assistants (PDAs) and communicator phones, whose viewing area ranges between approximately 300 and 800 pixels in width. The object of the MSR technique is to render a markup document within resolution limits, which are smaller than those for which the document was originally designed, without introducing horizontal scrolling.

Specifically, MSR seeks out document elements (e.g., table cells, containing blocks for images) that take up too much horizontal space, and individually resizes these elements by either squeezing them horizontally, or shrinking them to maintain their original aspect ratio. The contents of a resized element is also squeezed or shrunk, as necessary, to fit within the resized element. Original fonts and colors are kept in each element's contents, and the design and style is left virtually untouched. (However, wrapping of the contents may be implemented, when necessary, to fit within the page element.)

If, after resizing page elements down to predetermined limits, the page's elements do not fit within the horizontal viewing area, MSR may reposition the elements to avoid horizontal scrolling. Also, MSR may reposition elements to eliminate unused space in the viewing area.

Referring to FIG. 2, step S230 is performed after frames are reformatted according to either step S226 or step S228. In step S230, all other frame documents in the frameset, which are identified as "siblings" of the reformatted frames, may be analyzed to see whether their respective dimensions need to be recalculated. Sibling frames are defined as those frames that share a common row or column position in the frameset with a reformatted frame. Those of ordinary skill in the art will realize how to implement adjust the calculated frame dimensions of sibling frames in order to optimize the frame layout of the top-level frameset.

This may include, for example, decreasing one or more of the sibling frame's calculated dimensions to compensate for the increased dimensions of the reformatting document. (Generally, a sibling frame's dimensions would be decreased to the extent that the sibling frame contains space unused by its contents). Alternatively, the sibling frame's dimensions may be increased based on the reformatted frame, if doing so helps optimize the overall frame layout.

In an exemplary embodiment, step S230 is part of the steps recursively applied to the child frames of each nested frameset. Thus, the following points should be kept in mind:
The innermost frameset document in a set of nested frameset documents, may be expanded due to the reformatting of frames in step S226/S228 and the adjustment of sibling frames in step S230. As such, the siblings of the innermost frameset, may be adjusted based on any expansion of the innermost frameset, when step S230 is applied to the parent frameset.
Thus, if the parent frameset is contained in a higher-level frameset (i.e., "grandparent" frameset), any expansion of the parent frameset may result in its siblings being resized according to step S230 (as applied to the grandparent frameset). As such, the siblings of each nested frameset may be resized according to step 230 until processing reaches the top-level frameset document.

In step S232 the frameset is displayed according to the frame dimensions that are calculated and adjusted (if necessary) according to steps S218-S230. As stated above, the formatting process S210 only interprets the instructions in order to display the received frameset document according to the reformatting (e.g., removal of frame scrollbars, resizing of frames) described above. As such, the received markup language document is not rewritten or altered.

According to one possible embodiment, the Web browser 152 may enforce such reformatting by applying a browser style sheet. One example of this is a Cascading Style Sheet (CSS). Thus, the display step S232 may display the reformatted frames and elements of the top-level frameset document using the style sheet.

It should be noted that exemplary embodiments of the present invention are not limited to uses pertaining to the display of frameset document. The principles of the present invention may also be used to output the frameset document in other formats. For instance, the formatting process S210 may be used to reformat the frames in a suitable manner for printing.

For instance, many printers have a limited resolution, in terms of dots per inch (dpi). When this is translated to pixels, many computer printers have a smaller resolution than the computer's monitor. Such printers are usually able to compensate for overflow of a Web document's contents in one direction (usually vertical) by printing out multiple pages. However, overflow of the contents in the other direction generally results in the overflow being cut off (i.e., not printed).

The formatting process S210 described above in connection with FIG. 2 may be revised for use with a printer output, rather than a display. Specifically, Equations 1 and 2 may be revised by using the printer's resolution (translated in terms of pixels) as the available height and width parameters $\alpha_{height}$ and $\alpha_{width}$. In this variation, the top-level frameset documents may still be expanded in the vertical direction, because this can be compensated for by printing multiple pages. However, such expansion would not necessarily require a vertical scrollbar to be appended to the frameset document.

Figure 3:
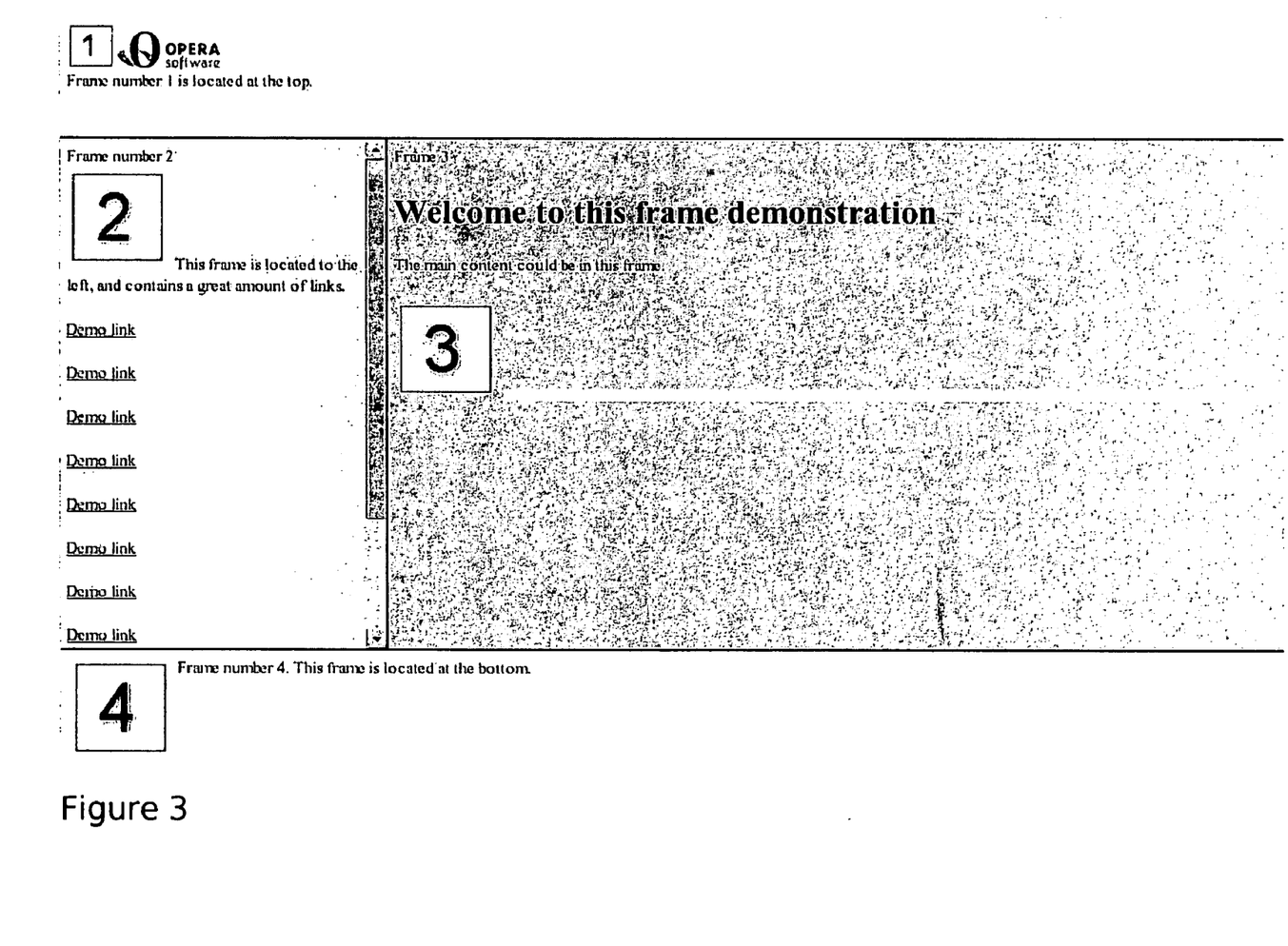
FIG. 3 is a screenshot illustrating an example of a frameset document, as it might be displayed on a high-resolution screen.

FIG. 3 is a screenshot of an exemplary frameset Web page, as it would be displayed on a high-resolution screen. The Web author has assumed that the page would be displayed on a screen with a screen resolution of approximately 1000×600 pixels. The Web page comprises four frames 1, 2, 3, and 4.

As shown in FIG. 3, Frame 1 is located on the top. Frame 2 is located to the left, and contains a large number of links. It is thus provided with a vertical scroll bar. Frame 3 may represent the main content of the Web page. Frame 4 is located on the bottom.

Figure 4:
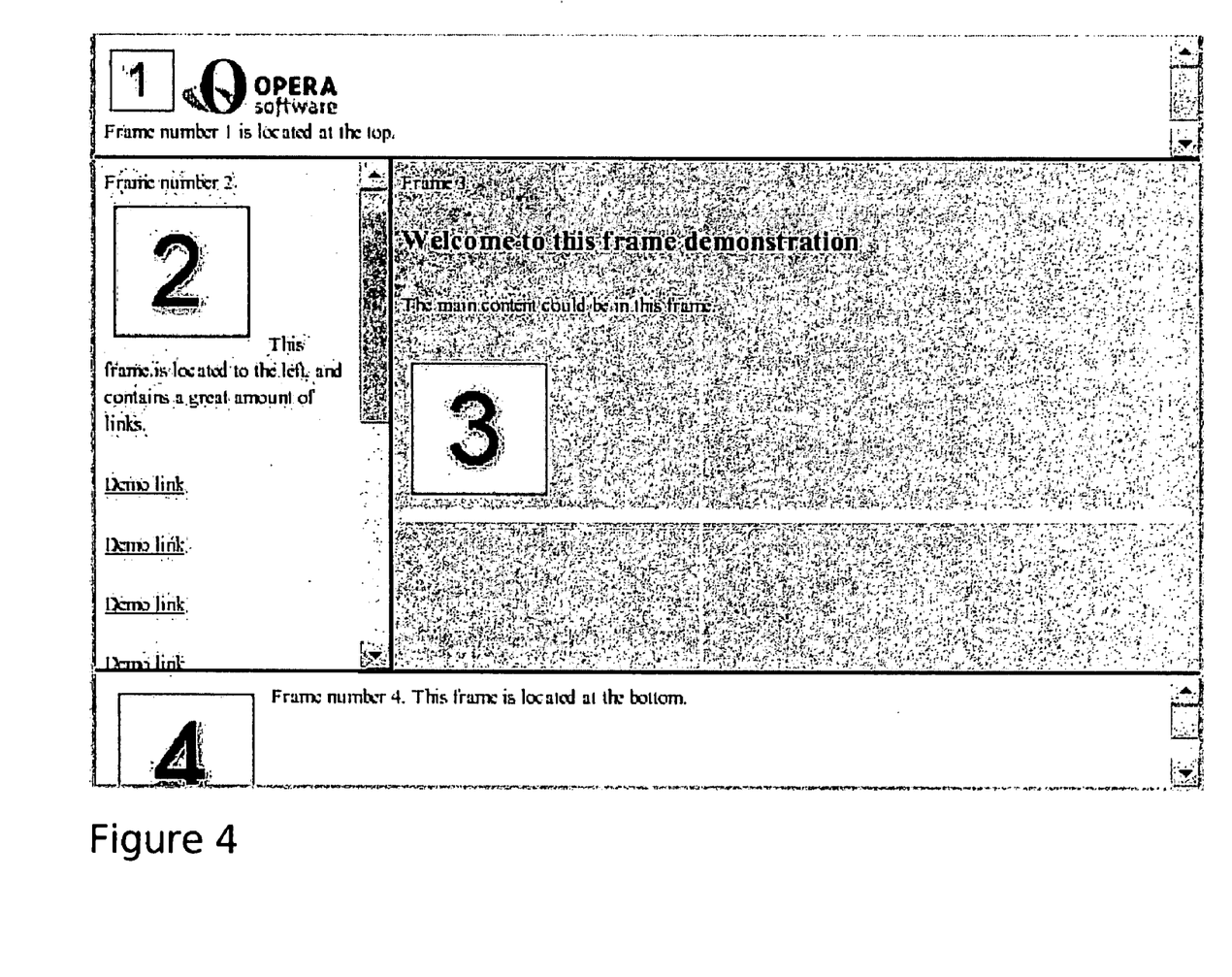
FIG. 4 is a screenshot illustrating the frameset Web page of FIG. 3, as it might be displayed on a medium-resolution screen, without using the present invention.

FIG. 4 is a screenshot of the frameset Web page displayed on a medium-sized screen (600×400 pixels), without the use of exemplary embodiments of the present invention.

As appears from FIG. 4, the Web page is displayed with an undesirably large number of scroll bars, resulting in a user interface that is cumbersome to operate.

Figure 5:
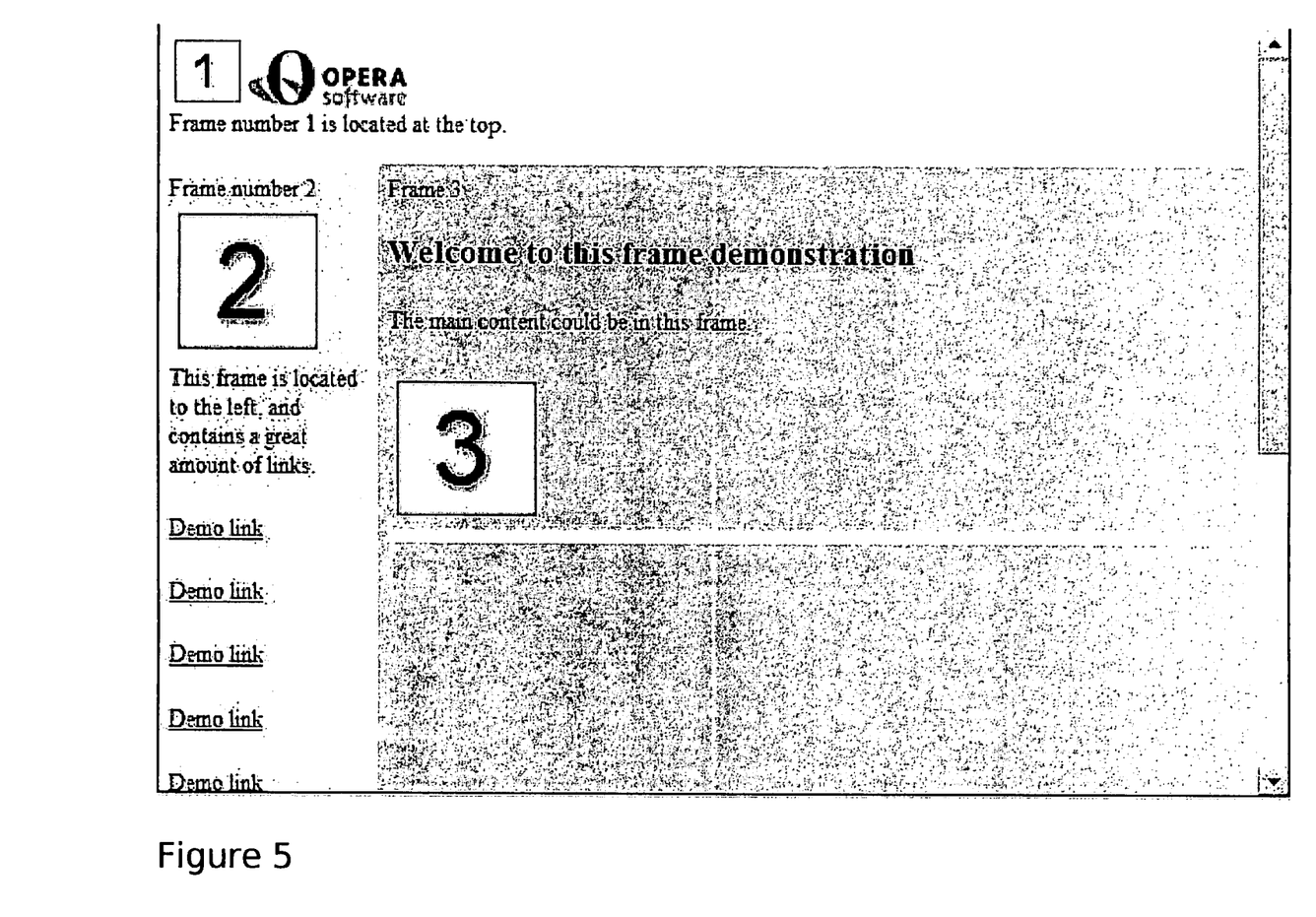
FIG. 5 is a screenshot of the frameset Web page of FIG. 3 being displayed on a medium-resolution screen, according to an exemplary embodiment of the present invention.

FIG. 5 is a screenshot of the frameset Web page displayed on a medium-resolution screen (600×400 pixels), wherein an exemplary embodiment according to the present invention has been applied.

As appears from FIG. 5, only one vertical scroll bar is present for the overall page. Neither vertical nor horizontal scroll bars are present in any frame inside this page.

Figure 6:
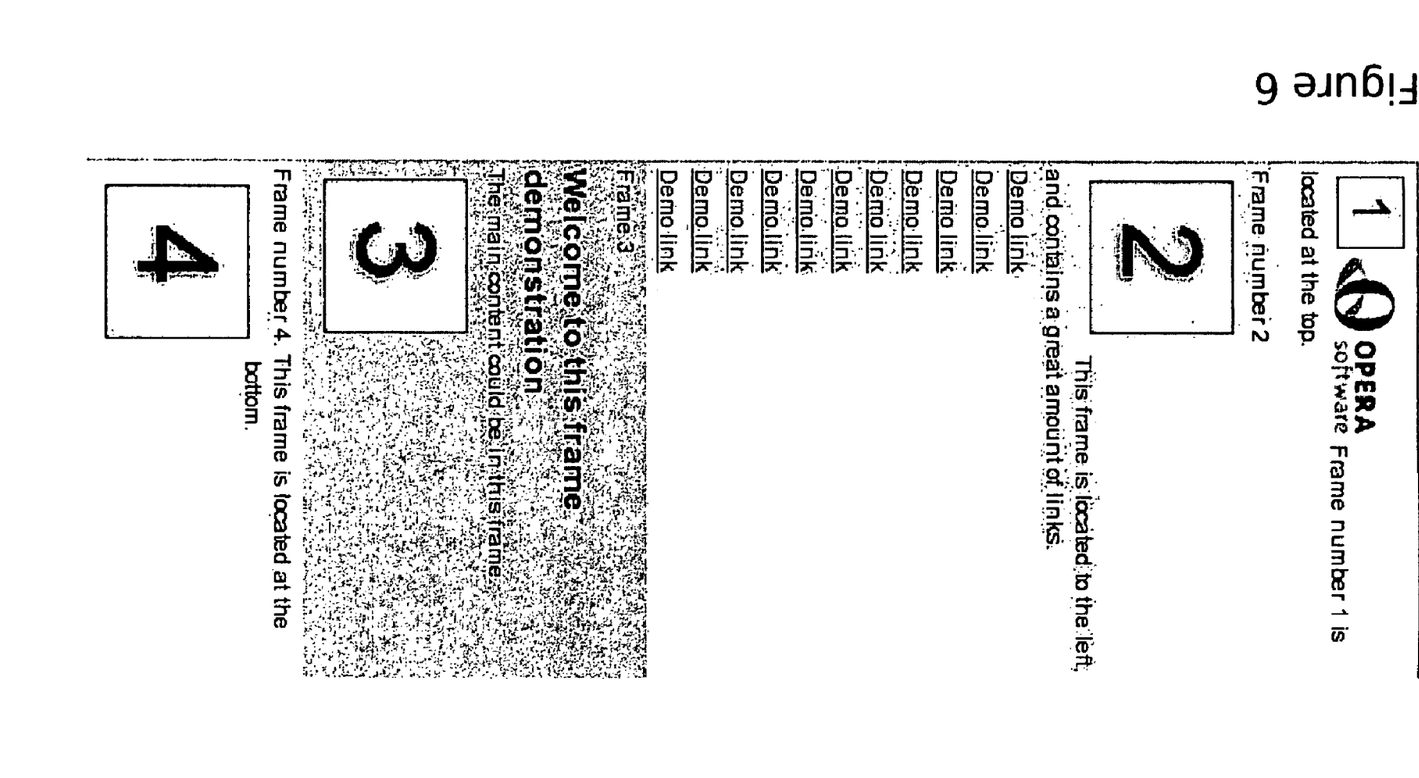
FIG. 6 is a screenshot of the frameset Web page of FIG. 3 being displayed on a low-resolution screen, according to an exemplary embodiment of the present invention.

FIG. 6 is a screenshot of the frameset Web page displayed on a low-resolution screen (200×600 pixels) where the present invention has been applied in its simplest form.

As appears from FIG. 6, the frames are stacked vertically. Only one vertical scroll bar is present for the overall page. Neither vertical nor horizontal scroll bars are present in any frame inside this page.

The method, the client terminal, and the computer program according to the present invention lead to useful results and technical effects. In particular, (X)HTML content is displayed in an intelligible, efficient, and user-friendly way on a low-resolution display even with very limited horizontal resolution. This results in a user interface that is easy to operate.

In the detailed description provided above, the present invention has been disclosed by way of exemplary embodiments. However, the present invention covers any modification of, or variation on, the above-described exemplary embodiments, as would be obvious to those of ordinary skill in the art. Such modifications and variations are within the spirit or scope of the present invention.

Although the terminal 100 is described in above exemplary embodiments as a mobile terminal, such as a mobile telephone or a palmtop computer, it will readily be recognized that the terminal 100 may alternatively be a television receiver adapted for Web-browsing purposes. In this case the display 110 is not particularly narrow, but it has reduced horizontal and vertical resolutions compared to a common computer screen. In such a television receiver terminal, the communication adapter 130 may be a modem or a broadband adapter, rather than a wireless or mobile communication device.

Alternatively, the terminal may be a desktop computer connected to a computer monitor with a relatively high resolution. For instance, exemplary embodiments of the present invention may ease the burden on the user to navigate though a frameset (X)HTML document, especially when the input devices of the computer are limited. For instance, if the user only has a keyboard to navigate the (X)HTML page, the present invention may help ease navigation by eliminating the need for the user to scroll through the individual frames.

What is claimed is:

1. A method for displaying a markup language document on a display screen of an electronic terminal, the markup language document including a frameset whose contents are arranged in a plurality of frames, the method comprising:
    reading by a processor, instructions in the markup language document;
    calculating by a processor, pixel dimensions for each frame in the markup language document based on the instructions, wherein the pixel dimensions are calculated in such a manner to allow all of the frames to fit within the pixel dimensions of the display screen;
    determining by a processor, whether the contents of each frame will fit within the pixel dimensions for that frame;
    adjusting by a processor, each frame in which the contents do not fit within the pixel dimensions for that frame by expanding at least one of the pixel dimensions for that frame; and
    displaying the frameset on the display screen based on the adjusted pixel dimensions,
    wherein the adjusting step is performed in such a manner that no more than one scrollbar is required for viewing the contents of all of the frames on the display screen.

2. The method according to claim 1, wherein the adjusting step further comprises changing relative positions of frames in the frameset.

3. The method of claim 2, wherein the adjusting step adjusts the frameset so that the frames are displayed in a vertically stacked arrangement, each frame extending across the available display width.

4. The method according to claim 3, wherein
    an available screen height is defined for the frameset in the display screen,
    when a height of the vertically stacked arrangement exceeds the available screen height, a vertical scrollbar is displayed in connection with the frameset, in order to allow the entire contents of the frameset to be viewed.

5. The method according to claim 1, wherein the pixel dimensions are calculated based on: an available space in the display screen for the frameset, and parameters defined for the frame in the instructions.

6. The method according to claim 5, wherein the calculating step calculates a height and width for the frame, according to the following:

$$S_H = \delta_H \times (\alpha_H / \beta_H), \text{ and}$$

$S_W = \delta_W \times (\alpha_W/(\beta_W))$, and where
- $S_H$ and $S_W$ are a calculated height and width for the frame, respectively, which are calculated in terms of pixels,
- $\delta_H$ and $\delta_W$, are a height and width for the frame, respectively, which are defined in terms of pixels, according to parameters in the instructions
- $\alpha_H$ and $\alpha_W$ are an available screen height and width for the frameset in the display screen, which are defined in terms of pixels, and
- $\beta_H$ and $\beta_W$ are a default display height and width, which are defined in terms of pixels, according to the instructions.

7. The method according to claim 1, further comprising for each frame containing a nested frameset, recursively performing the calculating and determining steps for each child frame in the nested frameset.

8. The method according to claim 1, further comprising:
reformatting the contents of a particular frame in the frameset,
wherein the adjusting step is performed on the particular frame if the reformatted contents are determined not to fit within the pixel dimensions of the particular frame.

9. The method according to claim 8, wherein the reformatting step includes:
reducing at least one of a size and quantity of the contents so that the reformatted contents will fit within the pixel dimensions of the particular frame.

10. The method according to claim 8, wherein the adjusting step expands at least one of the pixel dimensions for the particular frame, thereby allowing the reformatted contents to fit within the pixel dimensions of the particular frame.

11. An electronic terminal including a processing unit, which is configured to perform the method according to claim 1.

12. A computer-readable medium on which is embodied a computer program containing a set of instructions, which are executed by one or more computer processors in order to perform the method in claim 1.

13. A method for displaying a markup language document on a display screen of an electronic terminal, the markup language document including a frameset whose contents are arranged in a plurality of frames, the method comprising:
reading by a processor, instructions in the markup language document;
calculating by a processor, pixel dimensions for each frame in the markup language document based on the instructions, wherein the pixel dimensions are calculated in such a manner to allow all of the frames to fit within the pixel dimensions of the display screen;
determining by a processor, whether the contents of each frame will fit within the pixel dimensions for that frame;
when the contents of at least one frame do not fit within that frame's pixel dimensions, utilizing a processor to adjust the frameset by expanding the pixel dimensions for each frame; and
displaying the frameset on the display screen based on the adjusted pixel dimensions,
wherein:
scrollbars are not implemented for individual frames, and
the adjusting step proportionately expands the calculated pixel dimensions of each frame in the frameset such that: the height and width ratios for the frames are maintained, and the contents of each frame fit within the expanded pixel dimensions of the frame.

14. The method according to claim 13, wherein the pixel dimensions are calculated based on: an available space in the display screen for the frameset, and parameters defined for the frame in the instructions.

15. The method according to claim 14, wherein the calculating step calculates a height and width for the frame, according to the following:

$S_H = \delta_H \times (\alpha_H/\beta_H)$, and $S_W = \delta_W \times (\alpha_W/(\beta_W))$, and where
- $S_H$ and $S_W$ are a calculated height and width for the frame, respectively, which are calculated in terms of pixels,
- $\delta_H$ and $\delta_W$ are a height and width for the frame, respectively, which are defined in terms of pixels, according to parameters in the instructions
- $\alpha_H$ and $\alpha_W$ are an available screen height and width for the frameset in the display screen, which are defined in terms of pixels, and
- $\beta_H$ and $\beta_W$ are a default display height and width, which are defined in terms of pixels, according to the instructions.

16. An electronic terminal including a processing unit, which is configured to perform the method according to claim 14.

17. A computer-readable medium on which is embodied a computer program containing a set of instructions, which are executed by one or more computer processors in order to perform the method in claim 14.

18. The method according to claim 13, further comprising for each frame containing a nested frameset, recursively performing the calculating and determining steps for each child frame in the nested frameset.

19. The method according to claim 13, further comprising:
reformatting the contents of at least one frame in the frameset,
wherein the adjusting step is performed so that the reformatted contents fit within the expanded pixel dimensions of the at least one frame.

20. The method according to claim 13, wherein
the calculating step calculates a height and width for each frame, and the adjusting step expands the height and width for each frame;
an available screen height and width are defined for the frameset in the display screen,
a height of the frameset is defined as an aggregate of the expanded heights of the frames,
a width of the frameset is defined as an aggregate of the expanded widths of the frames,
when the height of the frameset exceeds the available screen height, a vertical scrollbar is displayed with the frameset, such that the vertical scrollbar allows scrolling throughout the entire height of the frameset, and
when the width of the frameset exceeds the available screen width, a horizontal scrollbar is displayed the frameset, in order to allow scrolling throughout the entire width of the frameset.

* * * * *